United States Patent
Schieber et al.

(10) Patent No.: US 7,451,209 B1
(45) Date of Patent: Nov. 11, 2008

(54) IMPROVING RELIABILITY AND AVAILABILITY OF A LOAD BALANCED SERVER

(75) Inventors: Ami Schieber, Ramat-Gan (IL); Sharon Schwartzman, Tel-Aviv (IL); Vicktoria Inbar, Rishon LeZion (IL)

(73) Assignee: Cisco Technology, Inc., San Jose, CA (US)

( * ) Notice: Subject to any disclaimer, the term of this patent is extended or adjusted under 35 U.S.C. 154(b) by 828 days.

(21) Appl. No.: 10/692,428

(22) Filed: Oct. 22, 2003

(51) Int. Cl.
*G06F 15/173* (2006.01)

(52) U.S. Cl. .................................. 709/224; 709/223

(58) Field of Classification Search ......... 709/223–224; 718/105
See application file for complete search history.

(56) References Cited

U.S. PATENT DOCUMENTS

| | | | |
|---|---|---|---|
| 4,621,359 A | 11/1986 | McMillen | |
| 5,155,851 A | 10/1992 | Krishnan | |
| 5,239,649 A | 8/1993 | McBride et al. | |
| 5,341,477 A | 8/1994 | Pitkin et al. | |
| 5,404,515 A | 4/1995 | Chasse et al. | |
| 5,444,848 A | 8/1995 | Johnson, Jr. et al. | |
| 5,537,542 A | 7/1996 | Eilert et al. | |
| 5,544,327 A | 8/1996 | Dan et al. | |
| 5,596,720 A | 1/1997 | Hamada et al. | |
| 5,774,660 A | 6/1998 | Brendel et al. | |
| 5,774,668 A | 6/1998 | Choquier et al. | |
| 5,828,847 A | 10/1998 | Gehr et al. | |
| 5,864,535 A | 1/1999 | Basilico | |
| 5,881,238 A | 3/1999 | Aman et al. | |
| 5,915,095 A | 6/1999 | Miskowiec | |
| 5,954,795 A | 9/1999 | Tomita et al. | |
| 6,003,079 A | 12/1999 | Friedrich et al. | |
| 6,023,722 A | 2/2000 | Colyer | |
| 6,078,960 A | 6/2000 | Ballard | |
| 6,185,601 B1 * | 2/2001 | Wolff | 709/203 |
| 6,219,790 B1 | 4/2001 | Lloyd et al. | |
| 6,259,705 B1 | 7/2001 | Takahashi et al. | |
| 6,263,368 B1 | 7/2001 | Martin | |
| 6,330,231 B1 | 12/2001 | Bi | |
| 6,401,121 B1 | 6/2002 | Yoshida et al. | |
| 6,539,445 B1 | 3/2003 | Krum | |
| 6,778,528 B1 | 8/2004 | Blair et al. | |
| 7,159,234 B1 * | 1/2007 | Murphy et al. | 725/87 |
| 7,185,045 B2 * | 2/2007 | Ellis et al. | 709/200 |
| 7,231,445 B1 | 6/2007 | Aweya et al. | |

(Continued)

OTHER PUBLICATIONS

International Search Report and Written Opinion in international application PCT/US04/37072 corresponding to U.S. Appl. No. 10/712,130, published by USPTO and WIPO, Oct. 10, 2007, 13 pages.

(Continued)

*Primary Examiner*—Ario Etienne
*Assistant Examiner*—Michael C Lai
(74) *Attorney, Agent, or Firm*—Hickman Palermo Truong & Becker LLP

(57) ABSTRACT

The invention provides a method and apparatus for improving reliability and availability of a load balanced server. The apparatus performs and the method provides the steps of monitoring the server's performance; detecting when the server's performance is worse than a failover threshold; and sending a message to one or more clients indicating that the one or more clients should failover to an alternate server.

41 Claims, 6 Drawing Sheets

U.S. PATENT DOCUMENTS

| | | | |
|---|---|---|---|
| 2002/0040402 A1 | 4/2002 | Levy-Abegnoli et al. | |
| 2002/0161891 A1 | 10/2002 | Higuchi et al. | |
| 2002/0194335 A1 | 12/2002 | Maynard | |
| 2003/0009698 A1* | 1/2003 | Lindeman et al. | 713/201 |
| 2003/0158933 A1* | 8/2003 | Smith | 709/224 |
| 2003/0217285 A1* | 11/2003 | Herrero et al. | 713/200 |
| 2004/0024861 A1* | 2/2004 | Coughlin | 709/224 |
| 2004/0132473 A1 | 7/2004 | Mir et al. | |

OTHER PUBLICATIONS

C. de Laat, et al., "Generic AAA Architecture," Aug. 2000, Network Working Group, Request for Comments: 2903, http://www.ietf.org/rfc/rfc2903.txt?number=2903, data retrieved Mar. 2, 2004, pp. 1-23.

J. Vollbrecht, et al., "AAA Authorization Framework," Aug. 2000, Network Working Group, Request for Comments: 2904, http://www.ietf.org/rfc/rfc2904.txt?number=2904, data retrieved Mar. 2, 2004, pp. 1-31.

G. Zorn, "Microsoft Vendor-specific RADIUS Attributes," Mar. 1999, Network Working Group, Request for Comments: 2548, http://www.ietf.org/rfc/rfc2548.txt?number=2548, data retrieved Mar. 2, 2004, pp. 1-36.

C. Rigney, et al., "Remote Authentication Dial in User Service (RADIUS)," Jun. 2000, Network Working Group, Request for Comments: 2865, http://www.ietf.org/rfc/rfc2865.txt=2865, data retrieved Mar. 2, 2004, pp. 1-67.

C. Rigney, "RADIUS Accounting," Jun. 2000, Network Working Group, Request for Comments: 2866, http://www.ietf.org/rfc/rfc2866.txt?number=2866, data retrieved Mar. 2, 2004, pp. 1-25.

G. Zorn, et al., "RADIUS Accounting Modifications for Tunnel Protocol Support," Jun. 2000, Network Working Group, Request for Comments: 2867, http://www.ietf.org/rfc/rfc2867.txt?number=2867, data retieved Mar. 2, 2004, pp. 1-10.

G. Zorn, et al., "RADIUS Attributes for Tunnel Protocol Support," Jun. 2000, Network Working Group, Request for Comments: 2868, http://www.ietf.org/rfc/rfc2868.txt?number=2868, data retrieved Mar. 2, 2004, pp. 1-18.

B. Aboba, "IANA Considerations for RADIUS (Remote Authentication Dial in User Service)," Jun. 2003, Network Working Group, Request for Comments: 3575, http://www.ietf.org/rfc/rfc3575.txt?number=3575, data retrieved Mar. 2, 2004, pp. 1-8.

M. Chiba, et al., "Dynamic Authorization Extensions to Remote Authentication Dial in User Service (RADIUS)," Jul. 2003, Network Working Group, Request for Comments: 3576, http://www.ietf.org/rfc/rfc3576.txt?number=3576, data retrieved Mar. 2, 2004, pp. 1-27.

L. Blunk, et al., "PPP Extensible Authentication Protocol (EAP)," Mar. 1998, Network Working Group, Request for Comments: 2284, http://www.ietf.org/rfc/rfc2284.txt?number=2284, data retrieved Mar. 2, 2004, pp. 1-14.

B. Aboba, et al., "PPP EAP TLS Authentication Protocol," Oct. 1999, Network Working Group, Requests for Comments: 2716, http://www.ietf.org/rfc/rfc2716.txt?number=2716, data retrieved Mar. 2, 2004. pp. 1-22.

B. Aboba, et al., "Authentication, Authorization and Accounting (AAA) Transport Profile," Jun. 2003, Network Working Group, Request for Comments: 3539, http://www.ietf.org/rfc/rfc3539.txt?number=3539, data retrieved Mar. 2, 2004, pp. 1-36.

B. Aboba, et al., "RADIUS (Remote Authentication Dial in User Service) Support for Extensible Authentication Protocol (EAP)," Sep. 2003, Network Working Group, Request for Comments: 3579, http://www.ietf.org/rfc/rfc3579.txt?number=3579, data retrieved Mar. 2, 2004, pp. 1-41.

P. Congdon, et al., "IEEE 802.1x Remote Authentication Dial in User Service (RADIUS) Usage Guidelines," Sep. 2003, Network Working Group, Request for Comments: 3580, http://www.ietf.org/rfc/rfc3580.txt?number=3580, data retrieved Mar. 2, 2004, pp. 1-27.

P. Calhoun, et al., "Diameter Base Protocol," Sep. 2003, Network Working Group, Request for Comments: 3588, http://www.ietf.org/rfc/rfc3588.txt?number=3588, data retrieved Mar. 2, 2004, pp. 1-129.

K. Zeilenga, "Lightweight Directory Access Protocol version 3 (LADAPv3): All Operational Attributes," Dec. 2003, Network Working Group, Request for Comments: 3673, http://www.ietf.org/rfc/rfc3673.txt?number=3673, data retrieved Mar. 2, 2004, pp. 1-5.

K. Zeilenga, "Feature Discovery in Lightweight Directory Access Protocol (LDAP)," Dec. 2003, Network Working Group, Request for Comments: 3674, http://www.ietf.org/rfc/rfc3674.txt?number=3674, data retrieved Mar. 2, 2004, pp. 1-5.

L. Howard, "An Approach for Using LDAP as a Network Information Service," Mar. 1998, Network Working Group, Request for Comments: 2307, http://www.ietf.org/rfc/rfc2307.txt?number=2307, data retrieved Mar. 2, 2004, pp. 1-19.

S. Varma, Letter, Canadian Intellectual Property Office, Ottawa, Canada, Mar. 4, 2008, 3 pages.

* cited by examiner

US 7,451,209 B1

IMPROVING RELIABILITY AND AVAILABILITY OF A LOAD BALANCED SERVER

FIELD OF THE INVENTION

The present invention relates to load balanced computers in a network. The invention specifically relates to a method and apparatus for improving reliability and availability of a load balanced server.

BACKGROUND OF THE INVENTION

In a client-server computer system, clients rely on servers to provide needed services. In the simplest form of these systems, a single server serves multiple clients. If this is the case, then any degradation in the quality of service (QOS) provided by the server, or failure of the server, will result in poor or failed service at each of its clients.

In many cases, however, this single point of failure is unacceptable. Therefore, systems are often built such that multiple servers are available to service clients, and clients are able to failover from one server to another. For example, if a client detects that a server fails to respond, then the client can switch to, or failover to, another server providing the same service.

Detecting the need for failover is usually governed by a timeout mechanism configured on the client. Typically, given a particular request, the client will wait for time T for a response from the server and will retry the request R times, again waiting time T for each retry. In a situation where the server can not respond in time T to the request, either because the server is down (has failed), or the QOS has degraded, then the client waits for a total time of R*T without a response to the request and then fails over to another server.

A problem with such a system is that the client wastes the total time to failover of R*T.

Another problem with the approach using a timeout on the client side is that it increases network traffic. Depending on implementation, O(R) messages per client will be passed when failover is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
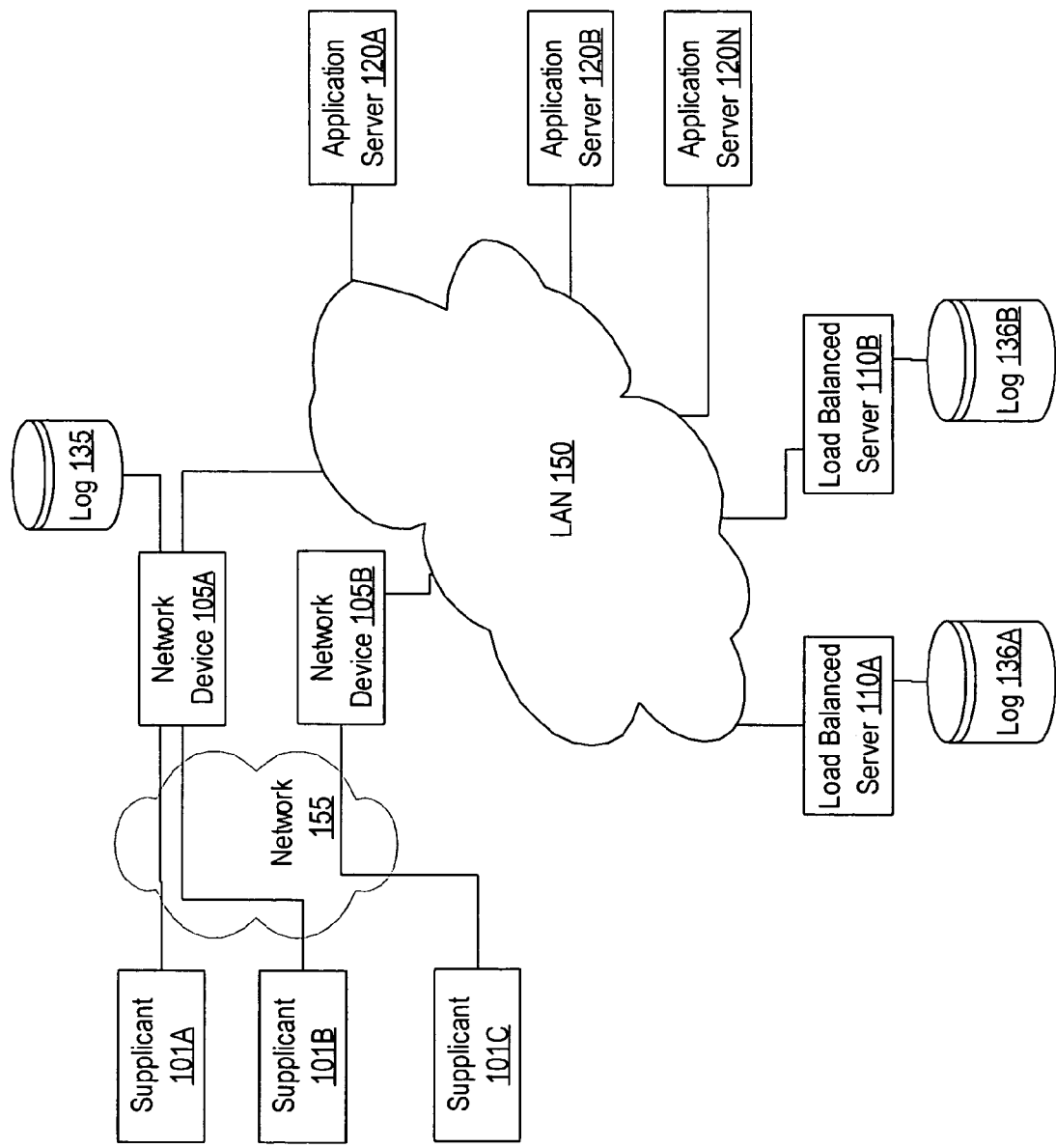
FIG. 1 depicts a block diagram of example architectural components and layout of a load balanced system.

A method and apparatus for improving reliability and availability of a load balanced server is described. In the following description, for the purposes of explanation, numerous specific details are set forth in order to provide a thorough understanding of the present invention. It will be apparent to one with ordinary skill in the art, however, that the present invention may be practiced without these specific details. In other instances, well-known structures and devices are shown in block diagram form in order to avoid unnecessarily obscuring the present invention.

General Overview

The needs identified in the foregoing Background, and other needs and objects that will become apparent for the following description, are achieved in the present invention, which comprises, in one aspect, a method for improving reliability and availability of a load balanced server comprising the steps of monitoring the server's performance; detecting when the server's performance is worse than a failover threshold; and sending a message to one or more clients indicating that the one or more clients should failover to an alternate server. In a related feature, the server is an AAA server and the one or more clients are AAA clients. In a related feature, the step of sending a message comprises sending an ICMP Echo message.

In a related feature, the step of monitoring the server's performance comprises measuring one or more parameters selected from the group consisting of server related parameters, system related parameters, and availability of services on the server. In a related feature, the server related parameters comprise a currently available number of threads and a maximum number of available threads. In a related feature, the system related parameters comprise CPU usage percentage, memory usage percentage, network availability, and number of processes running. In a related feature, the services of which the availability is checked on the server comprise mandatory services and dependent services.

In a related feature, the method further comprises the step of determining the one or more clients to which to send the message based on a predefined list of clients. In a related feature, the method further comprises the step of determining the one or more clients to which to send the message based on a network device group. In a related feature, the method further comprises the step of determining the one or more clients to which to send the message based on network topology. In a related feature, the method further comprises the step of determining the alternate server based on a list configured on each of the one or more clients. In a related feature, the message that is sent to the one or more clients comprises a list of one or more alternate servers to which the one or more clients can failover.

In a related feature, the method further comprises the step of checking authority of a message sent between a sender and a receiver by comparing a first hashed value, produced by the sender and sent with the message, with a second hashed value produced by the receiver. In a related feature, the method further comprises the step of producing the first hashed value and the second hashed value using a one-way hash algorithm with a shared secret as a key and a combination of the server's IP address and the client's IP address as input. In a related feature, the method further comprises the step of producing the first hashed value and the second hashed value using a one-way hash algorithm with a combination of a shared secret, the server's IP address, and the client's IP address as input.

In a related feature, the method further comprises the step of connecting with a second client. In a related feature, the method further comprises the step of initiating the step of connecting based on a request from the second client. In a related feature, the method further comprises the step of initiating the step of connecting based on a timeout mechanism configured on the second client. In a related feature, the method further comprises the step of initiating the step of connecting based on a request by the server. In a related feature, the method further comprises the step of initiating the step of connecting based on the server's performance being better than a connection threshold.

In a related feature, wherein the step of initiating comprises the step of comparing the connection threshold with a function relating one or more parameters from the group consisting of server related parameters, system related parameters, and availability of services on the server. In a related feature, wherein the server related parameters comprise a currently available number of threads and a maximum number of available threads. In a related feature, wherein the system related parameters comprise CPU usage percentage, memory usage percentage, and number of processes running. In a related feature, wherein the services of which the availability is checked on the server comprise services mandatory for correct functioning of the server and services needed for logging on the server.

In a related feature, the one or more clients comprise multiple clients, the method further comprises the step of connecting a first set of one or more clients at a first time, and the first set of one or more clients comprises one or more clients from the multiple clients; and the method further comprises the step of connecting a second set of one or more clients at a second time, the first time is different than the second time, and the second set of one or more clients comprises one or more clients from the multiple clients.

In a related feature, the one or more clients comprise all clients connected to the server. In a related feature, the one or more clients comprise a proper subset of all clients connected to the server. In a related feature, the second set of one or more clients comprises all of the one or more clients.

In a related feature, the method further comprises the step of disconnecting a first set of one or more clients, and the first set of one or more clients comprise one or more clients from the one or more clients; and the method further comprises the step of connecting a second set of one or more clients, wherein the second set of one or more clients comprise one or more clients from the first set of one or more clients.

In a related feature, the step of connecting comprises the steps of connecting each client of the second set of one or more clients at a different time; and initiating the step of connecting each client based on a timeout mechanism configured on each client.

In a related feature, the method further comprises the step of initiating the step of connecting based on the server's performance being better than a connection threshold, wherein the server's performance is measured as a function relating one or more parameters from the group consisting of server related parameters, system related parameters, and availability of services on the server.

In a related feature, the second set of one or more clients comprises multiple clients, and the step of connecting a second set of one or more clients comprises the steps of connecting a third set of one or more clients at a first time, with the third set of one or more clients comprises one or more clients from the multiple clients; and connecting a fourth set of one or more clients at a second time, with the first time is different than the second time, and the second set of one or more clients comprises one or more clients from the multiple clients.

In another aspect, a computer-readable medium carrying one or more sequences of instructions which, when executed by one or more processors, causes the one or more processors to perform any of the foregoing steps.

Structural Overview

FIG. 1 depicts a block diagram of example architectural components and layout of a load balanced system.

One or more supplicants 101A, 101B, 101C are communicatively coupled to network devices 105A, 105B. In one embodiment, communication of supplicants 101A, 101B, 101C with network devices 105A, 105B is over a network 155. In various embodiments, the network 155 is a wireless network, dial up access, the Internet, a local area network (LAN), or any other communication network. In various embodiments, the network device 105 is a wireless access point, a virtual private network device, a network access server, a switch, a router, or any other appropriate device.

The network devices 105A, 105B are communicatively coupled to a LAN 150. In various embodiments, the LAN 150 is a wireless network, dial up access, the Internet, or any other appropriate communications network. The network device 105A is also communicatively coupled to a log 135. In various embodiments, the log is a database, a flat file, or any other appropriate storage.

Zero or more application servers 120A, 120B, 120N are communicatively coupled to the LAN 150. One or more servers 110A, 110B are communicatively coupled to the LAN 150 and to respective logs 136A, 136B. In various embodiments, the servers are authentication, authorization, and accounting (AAA) servers, application servers, database servers, or any other servers that can support load balancing.

Consider this example of a functioning system of FIG. 1. Network device 105A acts as an access regulator for a supplicant 101A, controlling what the supplicant 101A can reach in the rest of the system depicted in FIG. 1. The network device 105A accounts for all of the activity that passes through it via a log 135. When supplicant 101A first tries to access a resource such as an application server 120A in the system 100, the network device 105A communicates with one of the load balanced AAA servers 110A to authenticate and authorize the supplicant 101A through the LAN 150. The authorization, authentication, and all other activity at the server 110A are accounted for in a log 136A.

Functional Overview

The following functional description assumes no particular hardware, operating system, software system, or other detail of an implementation. Additionally, the flow diagrams presented are examples of possible algorithmic flow and in no way limit the scope of the invention. Embodiments of the invention can be practiced in many ways in many disparate hardware and software environments and using different algorithmic flow.

One approach herein uses a predictive and preemptive method to indicate to clients that services from the server are going to degrade or fail and that the clients should move to alternate servers. An example system and scenario with load balanced authentication, authorization, and accounting servers and clients is described for purposes of illustrating a clear example, but many other embodiments are possible. The AAA clients are typically network devices. The AAA servers are typically load balanced in a network environment and provide the following services to AAA clients in that environment:

Authentication: Validating the claimed identity of an end user or a device, such as a host, server, switch, router, etc.

Authorization: Granting access rights to a user, groups of users, system, or a process.

Accounting: Establishing who, or what, performed a certain action, such as tracking user connection and logging system users.

Figure 2:
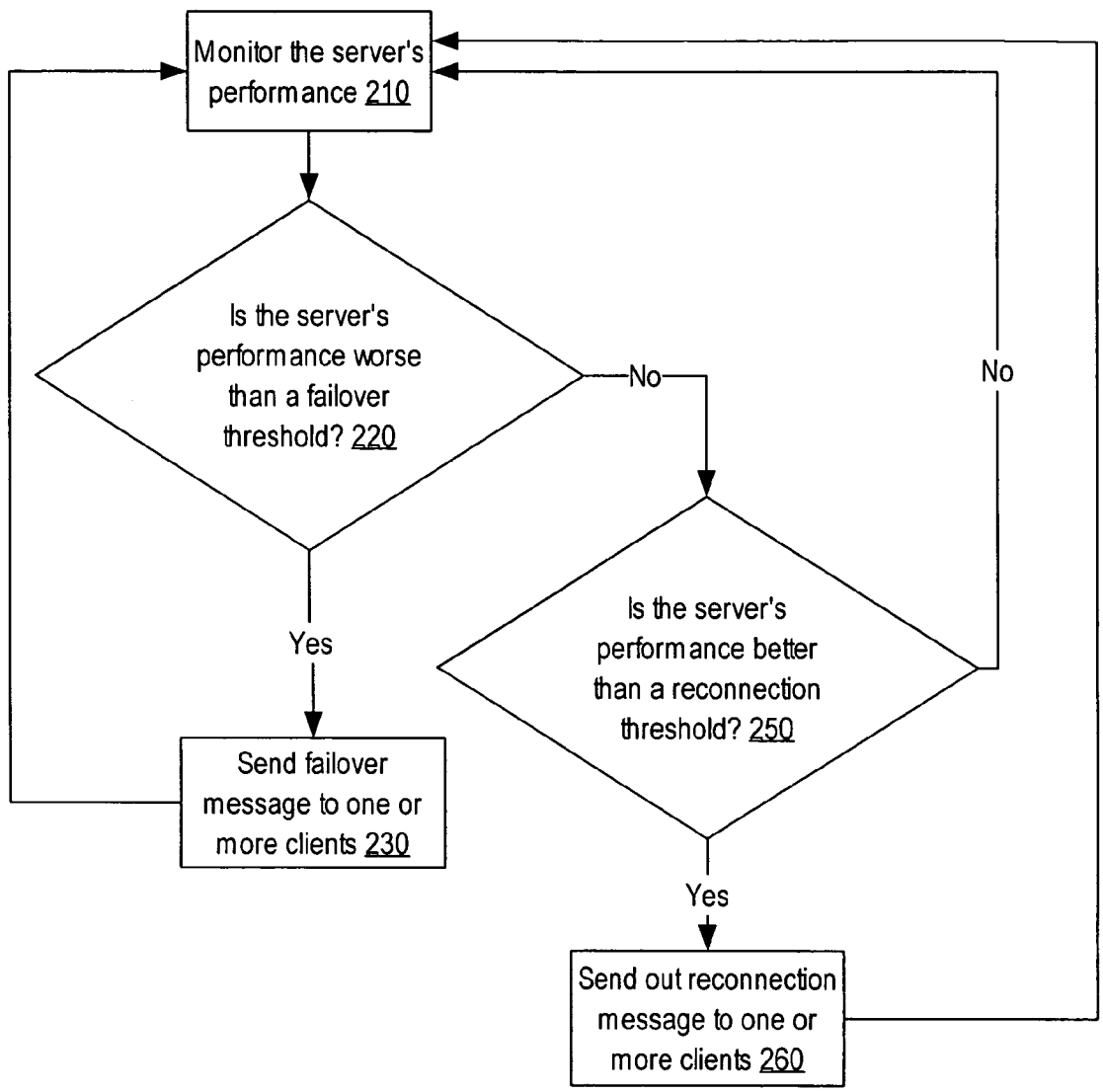
FIG. 2 depicts a flow diagram of a use of a prediction method for deferral of clients and also a server-initiated connection method.

FIG. 2 depicts a flow diagram of a use of a prediction method for deferral of clients and also a server-initiated connection method.

In block 210, a server's performance is monitored. In one embodiment, a server monitors its own performance. Alternatively, a process communicatively coupled to a server monitors the server's performance. In the context of FIG. 1, for example, a server 110A monitors its own performance.

Figure 4:
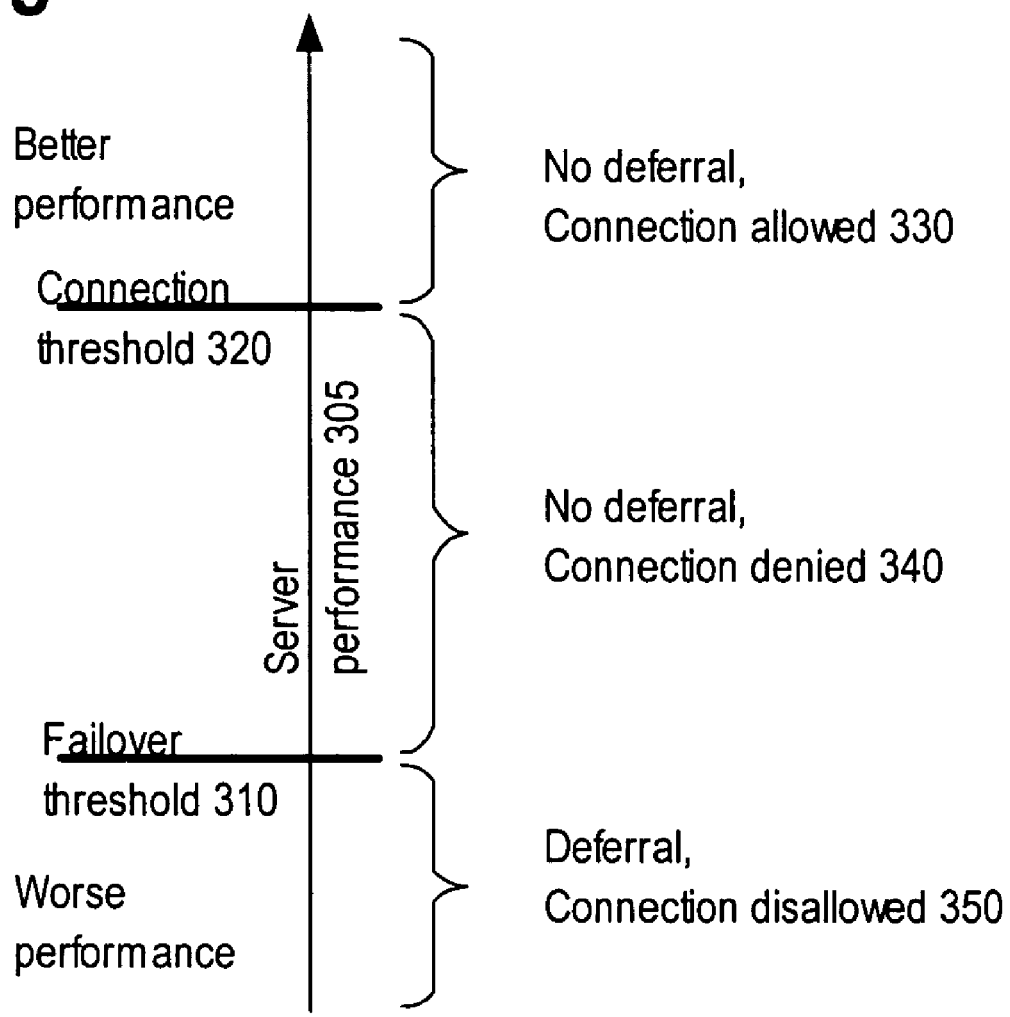
FIG. 4 depicts a flow diagram of a relationship among server performance, a connection threshold, and a failure threshold.

In block 220, a test is performed to determine whether a server's performance is worse than a failover threshold. In the context of FIG. 1 and FIG. 4, for example, a server 110A detects when its own performance is worse than a certain failover threshold 310.

If the server's performance is worse than the failover threshold, then, in block 230, a message is sent to one or more of the server's clients that indicates that the clients should failover to an alternate server. In various embodiments, the message is sent by a server or a process communicatively coupled to a server. In the context of FIG. 1, for example, a server 110A sends out a message to one or more network devices 105A, 105B.

If the server's performance is better than the failover threshold, then in block 250, a test is performed to determine whether a server's performance is better than a connection threshold. In various embodiments, the server itself compares its performance to the threshold, or a process communicatively coupled to a server compares the server's performance to the threshold. In the context of FIG. 1 and FIG. 4, a server 110A compares its performance 305 to a connection threshold 320.

If the server's performance is worse than a connection threshold, then the server's performance is monitored, block 210. In one embodiment, the server's performance is continually monitored.

If the server's performance is better than the connection threshold, then, in block 260, a process sends a connection message to one or more of the server's clients. In various embodiments, a server or a process communicatively coupled to a server sends the message. In various embodiments, the one or more of the server's clients include only previously deferred clients, only new clients, or both previously deferred and new clients. In the context of FIG. 1, for example, a server 110A sends out a connection message to one or more network devices 105A, 105B that were previously deferred.

The approach of FIG. 2 overcomes the need for a client to use a timeout mechanism for failover. It allows a server to initiate connection of previously deferred and new clients. Moreover, it reduces the network traffic associated with timeout, failover and reconnection.

Whereas FIG. 2 depicts a certain flow of events, the invention is not limited to these steps or this flow. Additional steps could be performed, steps could be left out, and the steps could be performed in parallel or in a different order.

Figure 3:
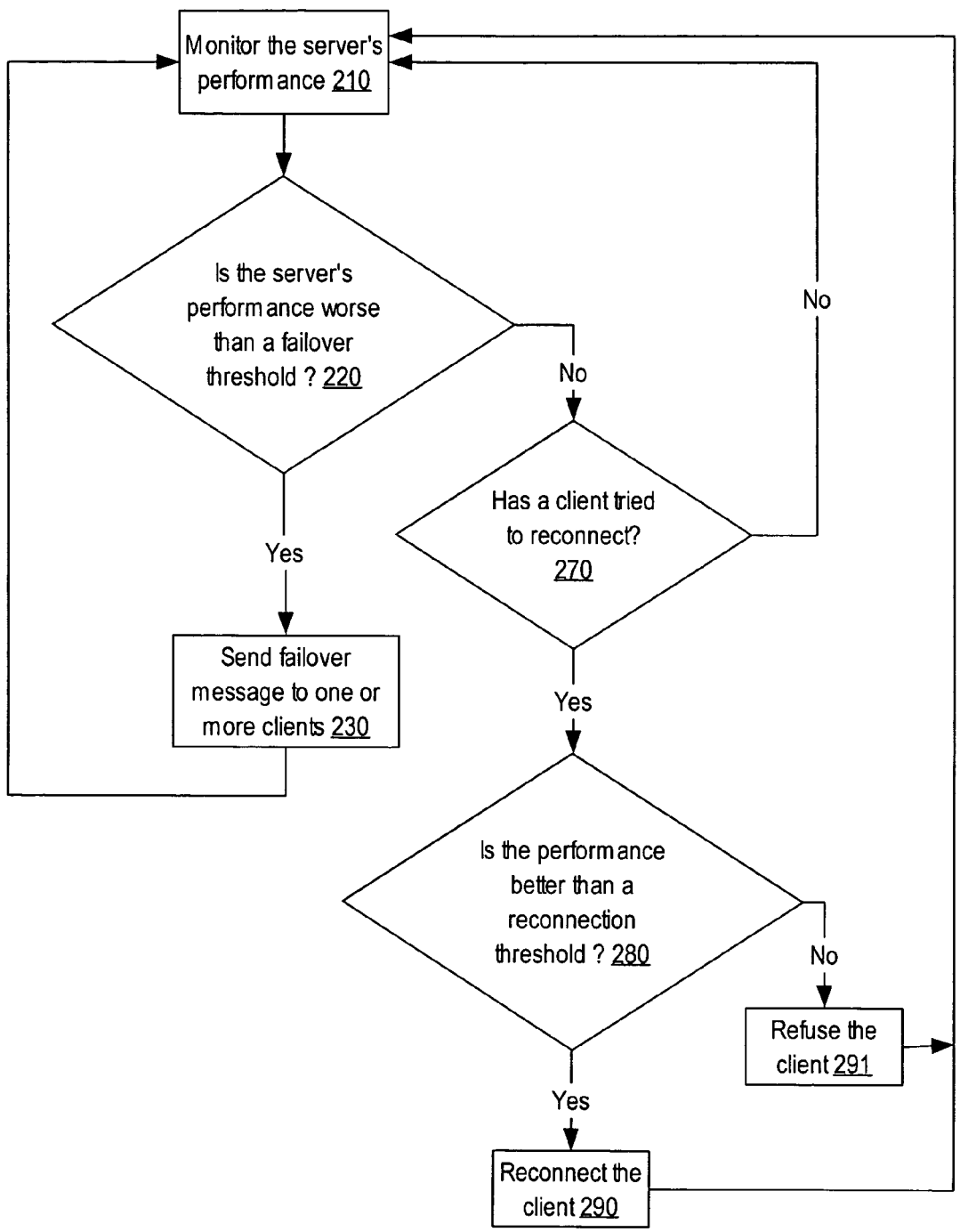
FIG. 3 depicts a flow diagram of a use of a prediction method for deferral of clients and also a client-initiated connection method.

FIG. 3 depicts a flow diagram of a use of a prediction method for deferral of clients and also a client-initiated connection method.

In block 210, the server's performance is monitored. In one embodiment, a server monitors its own performance. Alternatively, a process communicatively coupled to a server monitors the server's performance. In the context of FIG. 1, for example, a server 110A monitors its performance.

In block 220, it is detected when the server's performance is worse than a failover threshold. In the context of FIG. 1 and FIG. 4, for example, a server 1110A detects when its own performance is worse than a certain failover threshold 310.

If the server's performance is worse than the failover threshold, then, in block 230, a message is sent to one or more of the server's clients that indicates that the clients should failover to an alternate server. In various embodiments, a server or a process communicatively coupled to a server sends the message. In the context of FIG. 1, for example, a server 110A sends out a message to one or more network devices 105A, 105B.

If the server's performance is better than the failover threshold, then, in block 270, a test is performed to determine whether a client has tried to connect to a server. In various embodiments, the server itself performs a test to determine whether a client has tried to connect to the server, or a process communicatively coupled to a server performs a test to determine whether a client has tried to connect to the server. In the context of FIG. 1 and FIG. 4, a server 110A checks to see if a network device 105A has attempted to connect.

If no clients have tried to connect, then the server's performance is monitored, block 210. In various embodiments, the server's performance is continually monitored.

If one or more clients have tried to connect to the server, then, in block 280, the server's performance is compared to a connection threshold. In various embodiments, the server performs the comparison or a process communicatively coupled to a server performs that comparison. In the context of FIG. 1 and FIG. 4, for example, a server 110A compares its own performance to a connection threshold 320.

If the server's performance is better than a connection threshold, and clients have tried to connect, then, in block 290, a client is connected to a server. In one embodiment, the server allows connection of a requesting client. Alternatively, a process communicatively coupled to the server facilitates the connection of a client and the server. In the context of FIG. 1, for example, a server 110A allows connection of a network device 105A.

If the server's performance is worse than the connection threshold, then, in block 291, the connection of a client is refused. In one embodiment, a server refuses the connection of a client. Alternatively, a process communicatively coupled to a server refuses connection of a client to a server. In the context of FIG. 1, for example, a server 110A refuses connection of a network device 105A.

In various embodiments, the clients connecting are clients that were previously deferred or the clients connecting are new clients. In one embodiment, there is a connection threshold for new clients that is different than a connection threshold for previously deferred clients.

The process in FIG. 3 overcomes the need for a client to use a timeout mechanism for failover. It allows a client to initiate reconnection to a server. Moreover, it reduces the network traffic associated with timeout, failover and reconnection. Whereas FIG. 3 depicts a certain flow of events, the invention is not limited to these steps or this flow. Additional steps could be performed, steps could be left out, and the steps could be performed in parallel or in a different order.

FIG. 4 depicts a flow diagram of a relationship among server performance, a connection threshold, and a failure threshold.

In various embodiments, a failover threshold 310 and a connection threshold 320 are preconfigured in the server, are dynamically determined based on current state, are based on the quality of service guaranteed for a particular client, or are based on other appropriate sets of parameters. In one embodiment, a connection threshold 320 is triggered at a better performance than is a failover threshold 310. In this case, there are three server performance zones. When the server performance 305 is better than the connection threshold 320, the performance is in the zone 330 in which clients are not deferred and connections are allowed. When the server performance 305 is between the connection threshold 320 and the failover threshold 310, then the performance is in zone 340 in which failover has not been initiated, i.e. no clients are deferred, and connection is not possible. When the server performance 305 is below the failover threshold 310, the performance 305 is in zone 350 and connection is not allowed and clients are deferred. Such an approach is useful, for example, when a server must service existing clients and avoid overloading the system with new clients.

In another embodiment, a connection threshold 320 is equal to a failover threshold 310. In such an embodiment, the zone 340 does not exist. That is, either clients are deferred and no clients are allowed to connect, zone 350, or new clients are allowed to connect and no current clients are deferred, zone 330. Such an approach is useful, for example, when client connections to a server are short and failover is not expensive.

In yet another embodiment, a connection threshold 320 is triggered at a lower performance than is a failover threshold 310. In this embodiment, zones 350 and zone 330 still exist, but there is a different center zone. In the center zone of performance, new clients are allowed to connect, but are deferred after some amount of time. This approach is useful, for example, for clients that need high availability of first request, so the server should service their connection immediately if possible, and failover is inexpensive, allowing the client to inexpensively failover to another server after service of the first request.

The choice of which clients to defer could be based on a number of factors. These factors could include but are not limited to determining which clients are on a predefined list, which clients belong to a particular network device group, and the client's relation with respect to network topology. For example, when the factors include network topology, a server could defer those clients with high network latency, clients who are in congested areas of the network, or any of a number of other reason based on network topology.

Monitoring Performance

There are many aspects of performance that can be considered when monitoring a server's performance and making a prediction of degradation or failure. Performance characteristics for many servers fall into three primary categories: server-related parameters; system-related parameters; and availability of services on the server, for example, as part of blocks 210, 220, and 250 (FIG. 2 and FIG. 3).

Server-related parameters are those that are configurable or monitorable in the server itself. In general, any parameter that affects the availability or quality of service for a given server may be considered. For AAA servers, the server-related parameters may include the maximum number of threads available to service clients and the number of currently busy threads. If the number of currently available threads is nearing zero, the AAA server can, based on how low the number of available threads are and the expected incoming traffic, determine whether it is appropriate to defer some or all of its current AAA clients. In various embodiments, these parameters are obtained using application program interface (API) calls and operating system (OS) calls.

System-related parameters are those that are important to the functioning of the server. In the case of AAA servers, such parameters may include CPU usage, system memory usage, and network availability. If network availability is waning or CPU or memory usage is increasing, the quality of service could be adversely affected, and if extreme enough, the clients may be notified to failover to backup servers. In various embodiments, these parameters are obtained using system API calls and OS calls.

Availability of services can also be considered when monitoring a server's performance. Servers are often made up of multiple services, some of which are mandatory services, that is they are crucial to the functioning of the server, and other are dependent services, which are necessary for secondary functionality of the server, such as logging and monitoring. In the case of the AAA server, examples of mandatory services include the TACACS and RADIUS services. These two services provide communication and parsing of messages passed between the server and the network devices and internal AAA services, such as the authorization service. If both services are down, the AAA server will not function properly. Therefore, it may be necessary to defer clients and refuse connections of previously deferred clients.

An example of a dependent service is logging. If logging has failed or is otherwise unavailable, then the server may defer all clients and signal to the system administrator that the logging service needs to be restarted. In various embodiments, these parameters are obtained using system API calls and OS calls.

Secure Messaging

In various embodiments, to ensure that a client has received the failover message from its load balanced server and not from an unidentified host trying to instigate a denial of service for the client, the message contains information that is known or producible only to the server and client. In various embodiments, this type of security is accomplished using a one-way hashing algorithm such as Secure Hashing Algorithm (SHA-1) on a combination of client's IP address, server's IP address, and shared secret key. In various embodiments, this security is accomplished by using the message authentication code (MAC) approach and uses a shared secret as the key to the hash method and hashes a combination of the client and server IP addresses.

For example, in the context of FIG. 1, the server 110A produces a value, also known as a message digest, with a one-way hashing function and includes it with the failover signal. Then a network device 105A, upon receiving the message, then hashes what should be the same values on its side and compares the hash, or message digest, received in the message with the one that it has produced. If the values are equal, then the message is trusted. If not, the message is ignored and an alert is sent to the system administrator or a logging or monitoring service.

One of the many suitable formats for sending the failover message with the hash value is an Internet Control Message Protocol (ICMP) Echo message. In an AAA server, this protocol is easy to deploy and provides a free-form data field suitable for transferring the message digest. In various embodiments, protocols that allow transport of info needed to perform the foregoing steps are suitable.

Functional Architecture

Figure 5:
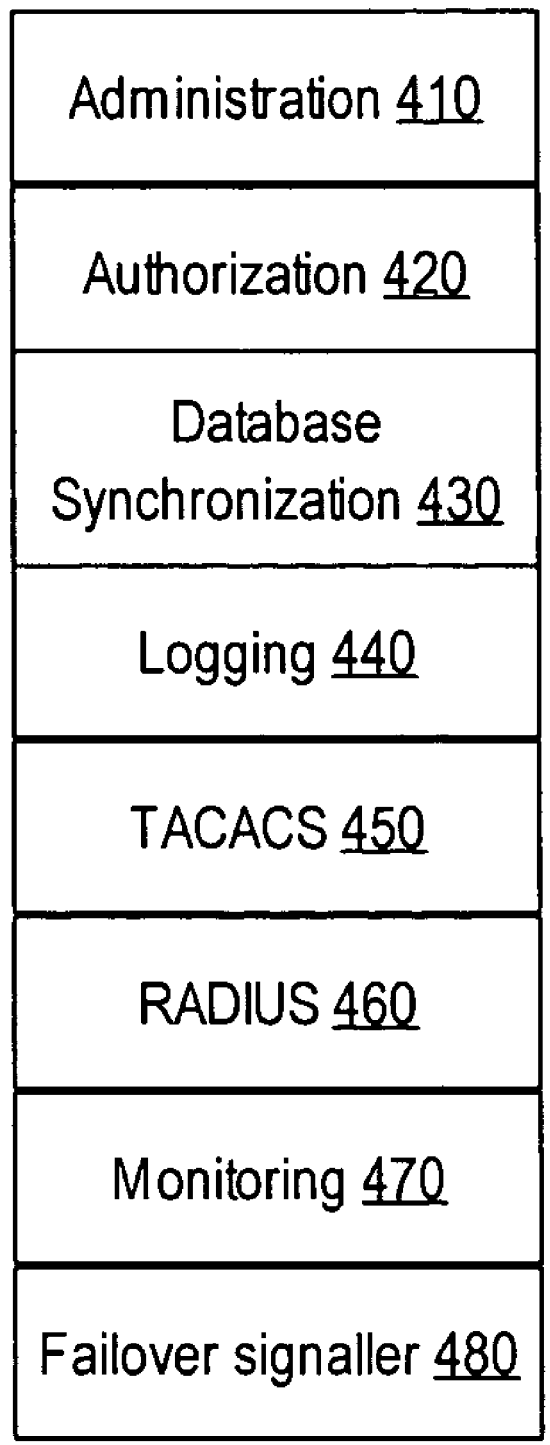
FIG. 5 depicts a block diagram of example architectural elements of a load balanced server that performs the foregoing steps.

FIG. 5 depicts a block diagram of example architectural elements of a load balanced server that performs the foregoing steps. In various embodiments, a server has multiple services. The administration service 410 provides a built-in web server for AAA administration of the multiple simultaneous sessions within the server. The authorization service 420 authenticates users, grants or denies service privileges, manages AAA databases, and handles external database authentication forwarding. The database synchronization service 430 manages database synchronization and replication to other AAA servers. The logging service 440 monitors and records user and administrator activities and activities related to backups and restoration, database replication, synchronizations, TACACS and RADIUS communication, VOIP activities, and any other service accounting needed. The TACACS service 450 and RADIUS service 460 handle communication and parsing of messages passed among devices and services. The monitoring service 470, monitors status of AAA services and server resources, records and reports all critical errors to logs, sends e-mail alerts to administrators noting any potential problems, automatically detects and restarts AAA services, and scrutinizes login frequency of users.

In various embodiments, the foregoing steps are performed by one or more of the services 410, 420, 430, 440, 450, 460, 470; are performed entirely by a service 480; or are performed by a service, 480, in combination with the services one or more of the services 410, 420, 430, 440, 450, 460, 470. For example, in the context of FIGS. 1, 4, and 5, as part of a server 110A, a monitoring service 470 provides information regarding the performance of the server 110A to a failover signaler 480, and when the performance is worse than a failover threshold 310, the failover signaler 480, sends an ICMP echo message to one or more network devices 105A, 105B to indicate that each should failover to an alternate server 110B.

The services listed in FIG. 5 do not assume any particular hardware configuration. The services can run as part of a single thread or process, can be separate threads or processes on the same physical computer, or can be running on multiple computers.

Hardware Overview

Figure 6:
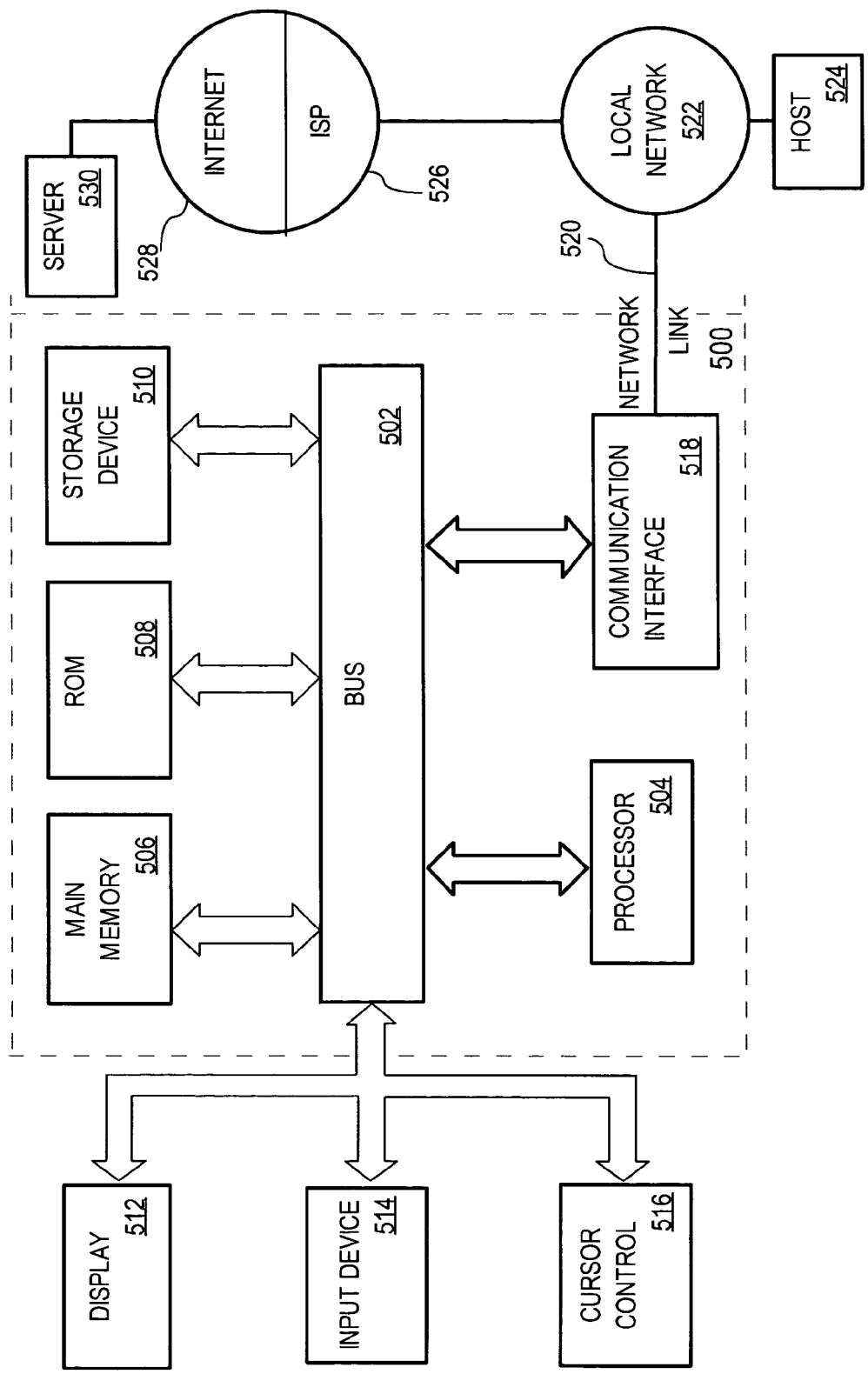
FIG. 6 is a block diagram that illustrates a computer system 500 upon which an embodiment of the invention may be implemented.

FIG. 6 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 maybe coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternate embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, storage media (such as non-volatile media), volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, storage media such as a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge transmission media such as, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for improving reliability and availability of a load balanced server comprising the steps of:
   monitoring the server's performance,
      wherein monitoring comprises measuring one or more parameters selected from the group consisting of a currently available number of threads, a maximum number of available threads, memory usage percentage, and a number of processes running;
   detecting when the server's performance is worse than a failover threshold;
   sending a message to one or more clients indicating that said one or more clients should failover to an alternate server;
   disconnecting a first set of one or more clients, wherein said first set of one or more clients comprise one or more clients from said one or more clients; and
   connecting a second set of one or more clients, wherein the second set of one or more clients comprise one or more clients from said first set of one or more clients, and wherein the step of connecting said second set of one or more clients comprises the steps of: connecting each client of said second set of one or more clients at a different time; and initiating the step of connecting each client based on a timeout mechanism configured on each client.

2. The method of claim 1, wherein the server is an AAA server and the one or more clients are AAA clients.

3. The method of claim 1, wherein the step of sending a message comprises sending an ICMP Echo message.

4. The method of claim 1, wherein the step of monitoring further comprises measuring availability of services, wherein the services of which the availability is checked on the server comprise mandatory services and dependent services.

5. The method of claim 1, further comprising the step of determining the one or more clients to which to send the message based on a predefined list of clients.

6. The method of claim 1, further comprising the step of determining the one or more clients to which to send the message based on a network device group.

7. The method of claim 1, further comprising the step of determining the one or more clients to which to send the message based on network topology.

8. The method of claim 1, further comprising the step of determining the alternate server based on a list configured on each of said one or more clients.

9. The method of claim 1, wherein the message that is sent to said one or more clients comprises a list of one or more alternate servers to which said one or more clients can failover.

10. The method of claim 1, further comprising the step of checking authority of a message sent between a sender and a receiver by comparing a first hashed value, produced by the sender and sent with the message, with a second hashed value produced by the receiver.

11. The method of claim 10, further comprising the step of producing the first hashed value and the second hashed value using a one-way hash algorithm with a shared secret as a key and a combination of the server's IP address and the client's IP address as input.

12. The method of claim 10, further comprising the step of producing the first hashed value and the second hashed value using a one-way hash algorithm with a combination of a shared secret, the server's IP address, and the client's IP address as input.

13. The method of claim 1, further comprising the step of connecting with a second client.

14. The method of claim 13, further comprising the step of initiating the step of connecting with said second client based on a request from the second client.

15. The method of claim 14, further comprising the step of initiating the step of connecting with said second client based on a timeout mechanism configured on the second client.

16. The method of claim 13, further comprising the step of initiating the step of connecting with said second client based on a request by the server.

17. The method of claim 16, further comprising the step of initiating the step of connecting with said second client based on the server's performance being better than a connection threshold.

18. The method of claim 17, wherein the step of initiating comprises the step of comparing the connection threshold with a function relating one or more parameters selected from the group consisting of server related parameters, system related parameters, and availability of services on the server.

19. The method of claim 18, wherein the server related parameters comprise a currently available number of threads and a maximum number of available threads.

20. The method of claim 18, wherein the system related parameters comprise CPU usage percentage, memory usage percentage, and number of processes running.

21. The method of claim 18, wherein the services of which the availability is checked on the server comprise services mandatory for correct functioning of the server and services needed for logging on the server.

22. The method of claim 1, wherein said one or more clients comprise all clients connected to said server.

23. The method of claim 1, wherein said one or more clients comprise a proper subset of all clients connected to said server.

24. The method of claim 1, further comprising the step of initiating the step of connecting said second set of one or more clients based on the server's performance being better than a connection threshold, wherein the server's performance is measured as a function relating one or more parameters selected from the group consisting of server related parameters, system related parameters, and availability of services on the server.

25. The method of claim 1, wherein said second set of one or more clients comprises multiple clients, and the step of connecting a second set of one or more clients comprises the steps of:
connecting a third set of one or more clients at a first time, wherein said third set of one or more clients comprises one or more clients from said multiple clients; and
connecting a fourth set of one or more clients at a second time, wherein said first time is different than said second time, and said second set of one or more clients comprises one or more clients from said multiple clients.

26. The method of claim 1, wherein said second set of one or more clients comprises all of said one or more clients.

27. A computer-readable storage medium carrying one or more sequences of instructions for improving reliability and availability of a load balanced server, which instructions, when executed by one or more processors, cause the one or more processors to carry out the steps of:
monitoring the server's performance,
wherein monitoring comprises measuring one or more parameters selected from the group consisting of a currently available number of threads, a maximum number of available threads, memory usage percentage, and a number of processes running;
detecting when the server's performance is worse than a failover threshold;
sending a message to one or more clients indicating that said one or more clients should failover to an alternate server;
disconnecting a first set of one or more clients, wherein said first set of one or more clients comprise one or more clients from said one or more clients; and
connecting a second set of one or more clients, wherein the second set of one or more clients comprise one or more clients from said first set of one or more clients, and wherein the step of connecting said second set of one or more clients comprises the steps of: connecting each client of said second set of one or more clients at a different time; and initiating the step of connecting each client based on a timeout mechanism configured on each client.

28. The computer-readable storage medium of claim 27, wherein the server is an AAA server and the one or more clients are AAA clients.

29. The computer-readable storage medium of claim 27, wherein the step of sending a message comprises sending an ICMP Echo message.

30. The computer-readable storage medium of claim 27, wherein the instructions, when executed, further cause the one or more processors to perform the step of checking authority of a message sent between a sender and a receiver by comparing a first hashed value, produced by the sender and sent with the message, with a second hashed value produced by the receiver.

31. The computer-readable storage medium of claim 27, wherein the instructions, when executed, further cause the one or more processors to perform the steps of:
initiating a connection with a second client, based on one or more of:
a request from the second client;
a timeout mechanism configured on the second client;
a request by the server; and
the server's performance being better than a connection threshold,
wherein initiating the connection with the second client further comprises comparing the connection threshold with a function relating one or more parameters selected from the group consisting of server related parameters, system related parameters, and availability of services on the server; and
connecting with a second client.

32. An apparatus for improving reliability and availability of a load balanced server, comprising:
means for monitoring the server's performance,
wherein monitoring comprises measuring one or more parameters selected from the group consisting of a currently available number of threads, a maximum number of available threads, memory usage percentage, and a number of processes running;
means for detecting when the server's performance is worse than a failover threshold;
means for sending a message to one or more clients indicating that said one or more clients should failover to an alternate server;
means for disconnecting a first set of one or more clients, wherein said first set of one or more clients comprise one or more clients from said one or more clients; and means for connecting a second set of one or more clients, wherein the second set of one or more clients comprise one or more clients from said first set of one or more clients, and wherein the means of connecting said second set of one or more clients comprises: means for connecting each client of said second set of one or more clients at a different time; and means for initiating the step of connecting each client based on a timeout mechanism configured on each client.

33. The apparatus of claim 32, wherein the server is an AAA server and the one or more clients are AAA clients.

34. The apparatus of claim 32, wherein the means for sending a message further comprises sending an ICMP Echo message.

35. The apparatus of claim 32, further comprising means for checking authority of a message sent between a sender and a receiver by comparing a first hashed value, produced by the sender and sent with the message, with a second hashed value produced by the receiver.

36. The apparatus of claim 32, further comprising:
means for initiating a connection with a second client, based on one or more of:
a request from the second client;
a timeout mechanism configured on the second client;
a request by the server; and
the server's performance being better than a connection threshold,
wherein the means for initiating the connection with the second client further comprises means for comparing the connection threshold with a function relating one or more parameters selected from the group consisting of server related parameters, system related parameters, and availability of services on the server; and
means for connecting with a second client.

37. An apparatus for improving reliability and availability of a load balanced server, comprising:
a network interface that is coupled to the data network for receiving one or more packet flows therefrom;
a processor;
one or more stored sequences of instructions which, when executed by the processor, cause the processor to carry out the steps of:
monitoring the server's performance,
wherein monitoring comprises measuring one or more parameters selected from the group consisting of a currently available number of threads, a maximum number of available threads, memory usage percentage, and number of processes running;
detecting when the server's performance is worse than a failover threshold;
sending a message to one or more clients indicating that said one or more clients should failover to an alternate server;
disconnecting a first set of one or more clients, wherein said first set of one or more clients comprise one or more clients from said one or more clients; and
connecting a second set of one or more clients, wherein the second set of one or more clients comprise one or more clients from said first set of one or more clients, and wherein the step of connecting said second set of one or more clients comprises the steps of: connecting each client of said second set of one or more clients at a different time; and initiating the step of connecting each client based on a timeout mechanism configured on each client.

38. The apparatus of claim 37, wherein the server is an AAA server and the one or more clients are AAA clients.

39. The apparatus of claim 37, wherein the step of sending a message further comprises sending an ICMP Echo message.

40. The apparatus of claim 37, further comprising the step of checking authority of a message sent between a sender and a receiver by comparing a first hashed value, produced by the sender and sent with the message, with a second hashed value produced by the receiver.

41. The apparatus of claim 37, further comprising the steps of:
initiating a connection with a second client, based on one or more of:
a request from the second client;
a timeout mechanism configured on the second client;
a request by the server; and
the server's performance being better than a connection threshold,
wherein the step of initiating the connection with the second client further comprises comparing the connection threshold with a function relating one or more parameters selected from the group consisting of server related parameters, system related parameters, and availability of services on the server; and
connecting with a second client.

* * * * *